(12) United States Patent
Yang et al.

(10) Patent No.: US 6,789,887 B2
(45) Date of Patent: Sep. 14, 2004

(54) INKJET PRINTING METHOD

(75) Inventors: Zhihao Yang, Webster, NY (US); Ravi Sharma, Fairport, NY (US); Simon Yandila, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/079,039

(22) Filed: Feb. 20, 2002

(65) Prior Publication Data

US 2003/0164869 A1 Sep. 4, 2003

(51) Int. Cl.$^7$ .................................................. B41J 2/01
(52) U.S. Cl. ..................... 347/100; 347/101; 347/96; 347/95
(58) Field of Search .............................. 347/100, 101, 347/96, 95; 106/31.13, 31.27, 31.6, 31.28, 31.41, 31.46, 31.43, 31.47; 523/160

(56) References Cited

U.S. PATENT DOCUMENTS

| | | | |
|---|---|---|---|
| 3,981,730 A | * | 9/1976 | Takahashi et al. ....... 106/31.07 |
| 5,181,045 A | | 1/1993 | Shields et al. |
| 5,198,023 A | | 3/1993 | Stoffel |
| 5,428,383 A | | 6/1995 | Shields et al. |
| 5,488,402 A | | 1/1996 | Shields et al. |
| 5,518,534 A | | 5/1996 | Pearlstine et al. |
| 5,854,307 A | * | 12/1998 | Kimura et al. .............. 347/100 |
| 5,888,285 A | * | 3/1999 | Gundlach et al. ........ 106/31.43 |
| 5,955,515 A | * | 9/1999 | Kimura et al. ........... 106/31.13 |
| 6,036,759 A | | 3/2000 | Wickramanayake et al. |
| 6,114,411 A | * | 9/2000 | Nakamura et al. .......... 523/161 |
| 6,281,267 B2 | | 8/2001 | Parazak |
| 2001/0000054 A1 | | 3/2001 | Maeda et al. |

FOREIGN PATENT DOCUMENTS

EP  0 771 861 A  5/1997

OTHER PUBLICATIONS

U.S. application Ser. No. 09/735,322 filed Dec. 12, 2000 of Yang et al "Microfluidic Valve and Method for Controlling the Flow of a Liquid".

* cited by examiner

Primary Examiner—Stephen D. Meier
Assistant Examiner—Manish Shah
(74) Attorney, Agent, or Firm—Sarah Meeks Roberts

(57) ABSTRACT

This invention relates to an inkjet printing method comprising providing a liquid inkjet ink which contains a thermally responsive material and applying the liquid ink jet ink onto an inkjet recording element in an imagewise fashion, wherein the inkjet recording element has been heated to a temperature higher than the temperature of the liquid inkjet ink.

16 Claims, No Drawings

INKJET PRINTING METHOD

FIELD OF THE INVENTION

This invention relates to methods of inkjet printing. It more specifically relates to a method of inkjet printing which utilizes an inkjet ink which contains a thermally responsive material.

BACKGROUND OF THE INVENTION

An inkjet printer produces images on a receiving medium by ejecting ink droplets onto the receiving medium in an imagewise fashion. The advantages of non-impact, low-noise, low energy use, and low cost operation in addition to the capability of the printer to print on plain paper are largely responsible for the wide acceptance of inkjet printers in the marketplace.

Photographic prints made using an inkjet printer desirably have an image resolution of about 24 line pairs/mm, which corresponds to about 20 $\mu$m per line or equivalently about 1200 dots per inch. Inkjet prints must have a dynamic range of about 128 gray levels or more in order to be comparable in image quality to conventional photographic prints.

Secondary colors are formed as combinations of primary colors. The subtractive primary colors are cyan, magenta and yellow, and the secondary ones are red, green and blue. Gray can be produced by equal amounts of cyan magenta and yellow, but less fluid is deposited on the paper if the gray is produced from an ink supply containing only black dye or pigment.

Consider forming a saturated spot of a secondary color with a typical print head emitting 4 pL drops. The 4 pL droplet has a diameter of about 20 $\mu$m in the air and forms a disk of about 30 $\mu$m on the paper. Adjacent droplets are typically aimed to be placed on 21 $\mu$m centers so that adjacent disks on the paper have some overlap and thus ensure that full area coverage is obtained and that jet misdirections do not produce visible artifacts. Then, as taught in U.S. Pat. No. 6,089,692 of Anagnostopoulos, if a saturated spot of a secondary color is to be formed, at least 256 droplets (128 of each of the primary colors) have to be deposited per 84×84 $\mu$m$^2$ area. The amount of fluid deposited per unit area is then about 145 mL/m$^2$. This is a major problem in printing photographic quality inkjet prints in that the amount of fluid deposited is at least a factor of 6 higher than the fluid holding capacity of commercial photo-grade inkjet papers.

A second problem with regards to producing photographic quality inkjet prints is that the penetration rates of ink into the image-receiving layer of presently available porous or swellable commercial receivers are too low. Consequently, the printing algorithms are written such that they do not allow a droplet to be placed on top of or adjacent to another droplet until sufficient time has elapsed. This results in slow printing time and is, therefore, unacceptable. If an attempt is made to print faster, coalescence and color bleed are observed. That is, if the second ink droplet arrives before the first droplet has been completely absorbed into the paper, the two merge or coalesce into one large droplet. This reduces the image resolution. Color bleed is essentially the same effect as coalescence, except that the two droplets that merge contain different color colorants. The result is poor image sharpness and color quality.

Inkjet print heads have been recently invented that are page wide and have nozzle spacing of finer than 300 per inch; see, for example, U.S. Pat. No. 6,079,821 of Chwalek et al. Such print heads produce 1 to 2 pL drops which are smaller than the typical droplets produced by commercial print heads. Also, because the print heads are page wide and have a large number of nozzles, they are capable of ink lay down rates substantially higher than that of scanning type conventional ink-jet printers. Unfortunately, coalescence and color bleed problems at the receiver surface may compromise the productivity of the page wide print heads. This constitutes a third problem with the printing of photographic quality inkjet prints, namely that the present receiver media seriously limit the productivity of these advanced print heads.

Several methods have been disclosed to reduce color bleed. U.S. Pat. Nos. 5,428,383 and 5,488,402 teach a method to control color bleed by using multivalent metal salts as precipitation agents in a first ink composition. The precipitation agent is designed to react with the coloring agent in a second ink composition. Other methods disclosed by U.S. Pat. Nos. 5,198,023; 5,518,534; 6,036,759; 5,181,045; and 6,281,267 are all involved in controlling color bleed by introducing precipitation reactions between inks. However, such precipitation reactions may result in non-uniformity in colorant distribution and may cause light scattering by precipitated particles. This will create negative viewing effects on image quality and are not acceptable in photographic printing.

Another method of controlling color bleed is to modify the surface of the receiving media by introducing a 3-dimensional micro-patterned structure that contains the inks within each micro-well element. Such a method has been disclosed in WO99/55537 and U.S. application Ser. No. 10/046,024 filed Oct. 29, 2001. However, it will significantly add cost to the prints.

There is still needed an effective method to control color bleeding and drop coalescence in inkjet printing, especially in high speed photographic inkjet printing.

SUMMARY OF THE INVENTION

This invention provides an inkjet printing method comprising providing a liquid inkjet ink which contains a thermally responsive material and applying the liquid inkjet ink onto an inkjet recording element in an imagewise fashion, wherein the inkjet recording element has been heated to a temperature higher than the temperature of the liquid inkjet ink. In one particular embodiment this invention provides an inkjet printing method with controlled color bleed and drop coalescence comprising;

a) loading ink ejecting elements of a printer with liquid inkjet ink comprising a thermally responsive material;

b) loading the printer with an inkjet recording element;

c) heating the inkjet recording element to a temperature higher than the temperature of the inkjet ink in the ink ejecting elements; and d) ejecting the liquid inkjet ink from the ink ejecting elements onto the heated inkjet recording element in response to digital data signals.

The method described herein minimizes the color bleed and coalescence on all receiving media without any special treatments.

DETAILED DESCRIPTION OF THE INVENTION

Color bleed and coalescence is generally caused by inter-droplet diffusion of colorants between adjacent ink drops before the drops have dried by adsorption into the media and/or evaporation of the solvents in the ink. Therefore, a longer drying time and a higher diffusion rate of the colorants will result in a more severe color bleed problem. It is well understood that the diffusion rate of colorants in inks is inversely proportional to the viscosity of the inks. In other words, the higher the ink viscosity when the ink is on the receiving media, the lower the diffusion rate of the colorants, and the less problem in color bleed and drop coalescence. However, with current inkjet ink ejecting technology, it is generally required that the inks have a viscosity below 20 centipoise and preferably below about 10 centipoise, when they are being ejected from an inkjet ejecting element.

The inkjet ink utilized in the current invention comprises a thermally responsive material, such that the viscosity of the ink increases rapidly when the ink is heated and the ink rapidly forms a non-fluidic gel at the elevated temperature. Such gelling is a direct result of the presence of the thermally responsive material and does not result merely from evaporation of the solvent. In the current invention the inkjet ink is ejected from the printhead in its liquid state, and when it comes in contact with the heated recording element (also known as a receiving element), the viscosity of ink increases. The ink itself is not generally heated prior to contact with the recording element. Preferably the ink has a viscosity of from about 0.5 to about 20 centipoise, and more preferably from about 1 to about 10 centipoise, at room temperature, e.g., 22° C.; and has a viscosity above 20 centipoise, and more preferably above about 1000 centipoise when it is heated to its gel transition temperature, i.e., the temperature at which the viscosity of the ink increases dramatically as the ink is heated. In the current invention the inkjet recording element is heated to a temperature higher than the temperature of the inkjet ink when it is in its liquid state, the liquid state being preferably less than about 20 centipoise and more preferably less than 10 centipoise. The inkjet recording element must be heated to at least the gel transition temperature of the inkjet ink. Preferably the inkjet recording element is heated to a temperature of about 35° C. to 100° C., and more preferably 40° C. to 80° C. In one embodiment the inkjet ink should obtain a viscosity of greater than 1000 centipoise immediately after contacting the recording element, immediately meaning preferably within 0.01 seconds of contact.

The phrase "inkjet ink" as utilized herein includes a colorant, the thermally responsive material, if necessary a solvent (which may be water) and any of the other optional additives discussed below. It is the viscosity (both in its liquid state and above its gel transition temperature) of the composition of the ink as it is utilized in the printer which is important, i.e., the inkjet ink, regardless of its composition must dramatically increase its viscosity as it contacts the heated receiving element. Therefore, more or less of the thermally responsive material may be needed depending on the other additives in the inkjet ink.

Materials which will gel in response to heat are known to those skilled in the art. In a preferred embodiment of the invention, the thermally responsive material comprises at least one kind of block copolymers with at least one block comprising poly(ethylene oxide), or PEO. In another preferred embodiment of the invention, the thermally responsive material comprises a tri-block copolymer of poly(ethylene oxide)-poly(propylene oxide)-poly(ethylene oxide), or PEO-PPO-PEO dissolved in an aqueous solution. This material is sold commercially as Pluronic® (BASF Corp.).

In one embodiment of the invention, the inkjet ink contains about 0.1–40% of the thermally responsive material and about 0.5–10% of a colorant, such as a dye or a pigment. As noted above, the inks at room temperature, e.g., 22° C., are liquids with a typical viscosity less than 10 centipoise (cP). The viscosity of the ink increases dramatically when heated from room temperature to about 80° C. For example, a 15% by weight aqueous solution of Pluronic® P85 has a viscosity of about 4 centipoise at 22° C. and a viscosity of about 3000 centipoise at 80° C.

In another embodiment, a methyl cellulose polymer may be used as a thermally-responsive material in the carrier fluid. For example, 2.75 wt. % solution of METHOCEL(® K100LV (Dow Chemical Co.) having a viscosity of about 10 to about 100 centipoise at about 30° C. to about 50° C. and a viscosity of more than 1000 centipoise at 75° C. can be used.

The ink used in the invention usually contains a colorant such as a pigment or dye. Suitable dyes include acid dyes, direct dyes, solvent dyes, or reactive dyes listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802 246-A1 and JP 09/202043, the disclosures of which are incorporated herein by reference.

Any of the known organic pigments can be used to prepare inkjet inks used in the invention. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow, and black (CMYK) pigments are used. An exemplary four-color set is a cyan pigment, bis(phthalocyanyl-alumino)tetraphenyldisiloxane, quinacridone magenta (pigment red 122), pigment yellow 74, and carbon black (pigment black 7).

In addition to the thermally responsive material, a humectant may be employed in the inkjet compositions used in the invention to help prevent the ink from drying out or crusting in the orifices of the print head. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, poly(ethylene glycol) monobutyl ether (PEGMBE), and diethylene glycol monobutylether (DEGMBE); nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Penetrants may also be added to the inks employed in the invention to help the ink penetrate the receiving substrate, especially when the substrate is a highly sized paper. Examples of such penetrants include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as ethyl lactate, ethylene carbonate, and propylene carbonate.

Polymeric binders can also be added to the ink employed in the invention to improve the adhesion of the colorant to the support by forming a film that encapsulates the colorant upon drying. Examples of polymers that can be used include polyesters, polystyrene/acrylates, sulfonated polyesters, polyurethanes, polyimides, and the like. The polymers may be present in amounts of from about 0.01 to about 15 percent by weight, and more preferably from about 0.01 to about 5 percent by weight based on the total amount of components in the ink.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol 465® (available from Air Products Corp.) and Tergitol 15-S-5® (available from Union Carbide).

A biocide may be added to the ink composition employed in the invention to suppress the growth of micro-organisms such as molds, fungi, etc. in aqueous inks. A preferred biocide for the ink composition employed in the present invention is Proxel® GXL (Zeneca Specialties Co.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric, and sulfuric acids. Typical organic acids include methanesulfonic, acetic, and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), water (0–90%), a humectant (0–70%), the thermally responsive material (0.1–40%), penetrants (0–20%), surfactant (0–10%), biocide (0.05–5%), and pH control agents (0.1–10%).

Additional additives which may optionally be present in the inkjet ink compositions employed in the invention include thickeners, conductivity enhancing agents, antikogation agents, drying agents, waterfast agents, dye solubilizers, chelating agents, binders, light stabilizers, viscosifiers, buffering agents, anti-mold agents, anti-rusting agents, anti-curl agents, dispersants and defoamers. Examples of buffering agents include, but are not limited to, sodium borate, sodium hydrogen phosphate, sodium dihydrogen phosphate, mixtures thereof, and the like.

Ink-receptive substrates or ink receiving media useful in inkjet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The inkjet inks utilized in the method of this invention are employed in inkjet printing wherein liquid ink drops are applied in a controlled fashion to any inkjet recording element by ejecting ink droplets from a plurality of nozzles or orifices contained in the print head of an inkjet printer. Commercially available inkjet printers use several different methods to control the deposition of the ink drops. Such methods are generally of two types: continuous stream and drop-on-demand. In-drop-on demand systems, the droplet of ink is ejected from an orifice directly to a position on the inkjet recording element by pressure created by, for example, a piezo-electric device, an acoustic device, or a thermal process control, in accordance with digital data signals. An ink droplet is not generated and ejected through the orifices of the print head unless it is needed. Ink jet printing methods and related printers are commercially available and need not be described in detail.

The method of the invention may be utilized with any type of inkjet printer which has a means to heat the recording element. The heat source might be placed below the recording element, for example, a heating plate or drum. The recording element might also be heated by a heat source placed above the paper. In one embodiment of the invention the method comprises;

a) loading ink ejecting elements of a printer with liquid inkjet ink comprising a thermally responsive material;

b) loading the printer with an inkjet recording element;

c) heating the inkjet recording element to a temperature higher than temperature of the inkjet ink in said ink ejecting elements; and d) ejecting the liquid inkjet ink from the ink ejecting elements onto the heated inkjet recording element in response to digital data signals.

The following examples are intended to illustrate but not to limit the invention.

EXAMPLES

Example 1

Viscosity vs. Temperature of Thermally Responsive Solutions

Thermally responsive solutions were formulated by dissolving a tri-block copolymer of poly(ethylene oxide)-poly(propylene oxide)-poly(ethylene oxide), or PEO-PPO-PEO in an aqueous solution. A series of the PEO-PPO-PEO tri-block copolymers were obtained from BASF under the product trade name of Pluronic®.

A Rheometrics ARES Fluids Spectrometer, from Rheometric Scientific, Inc., equipped with a corvette geometry, was used to measure the oscillatory shear properties of the Pluronic® solutions. Dynamic viscosity was measured continuously as the temperature was ramped from 20° C. to 80° C. The typical ramp rate was 1° C./minute. The fluids were initially characterized at 20° C. in a continuous shear experiment covering a typical range of shear rates from 1 to 100/second. All were found to have low viscosity and Newtonian response. For the temperature scan experiments, a monitoring frequency of 10 radians/second was used.

The results are shown in the following tables:

TABLE 1

| Temperature (° C.) | Viscosity (Poise) of Pluronic ® P85 Solutions | | |
|---|---|---|---|
| | 20% | 15% | 10% |
| 25 | 0.09 | 0.037 | 0.022 |
| 30 | 0.112 | 0.033 | 0.017 |
| 35 | 0.113 | 0.031 | 0.014 |
| 40 | 0.096 | 0.026 | 0.012 |
| 45 | 0.079 | 0.022 | 0.01 |
| 50 | 0.066 | 0.019 | 0.008 |
| 55 | 0.054 | 0.016 | 0.007 |
| 60 | 0.05 | 0.014 | 0.006 |
| 62 | 0.069 | 0.016 | 0.007 |

TABLE 1-continued

| Temperature (° C.) | Viscosity (Poise) of Pluronic ® P85 Solutions | | |
|---|---|---|---|
| | 20% | 15% | 10% |
| 64 | 0.143 | 0.029 | 0.011 |
| 66 | 0.382 | 0.065 | 0.022 |
| 68 | 1.283 | 0.185 | 0.059 |
| 70 | 5.176 | 0.792 | 0.194 |
| 72 | 15.018 | 3.684 | 0.821 |
| 74 | 31.802 | 11.303 | 3.534 |
| 76 | 46.005 | 21.505 | 9.134 |
| 78 | 52.008 | 28.574 | 13.39 |
| 80 | 51.921 | 30.369 | 17.917 |

TABLE 2

| Temperature (° C.) | Viscosity (Poise) 25% Pluronic ® L62 Solution |
|---|---|
| 22 | 0.072 |
| 25 | 0.068 |
| 28 | 0.069 |
| 30 | 0.073 |
| 32 | 0.081 |
| 34 | 0.1 |
| 36 | 0.136 |
| 38 | 0.237 |
| 40 | 0.44 |
| 42 | 0.834 |
| 44 | 0.976 |
| 46 | 1.777 |
| 48 | 5.864 |
| 49 | 26.704 |
| 50 | 37.107 |
| 52 | 40.677 |
| 54 | 35.045 |
| 56 | 31.245 |

TABLE 3

| Temperature (° C.) | Viscosity (Poise) 22% Pluronic ® F87 Solution |
|---|---|
| 22 | 0.201 |
| 25 | 0.242 |
| 30 | 0.525 |
| 32 | 0.696 |
| 34 | 0.968 |
| 36 | 1.225 |
| 37 | 1.505 |
| 38 | 385 |
| 39 | 13873 |
| 40 | 17046 |
| 41 | 15056 |
| 42 | 14963 |
| 45 | 14512 |
| 50 | 15008 |
| 55 | 15509 |

The above results show that the Pluronic® P85 solutions with the concentrations from 10% to 20% have viscosity increases of more than 3 orders of magnitude when the temperature increases from 60° C. to 80° C., the 25% Pluronic® L62 solution has a 3 order of magnitude viscosity increase with temperature from 30° C. to 50° C., and the 22% Pluronic® F87 solution has a more than 5 order of magnitude viscosity increase with temperature from 30° C. to 40° C. The results demonstrated that these fluids are thermally responsive and can be used in the method of the invention.

Example 2

This example demonstrates a set of thermally responsive inks with cyan, magenta, yellow, and black (CMYK) colors. The thermally responsive inks were formulated by dissolving 15% wt of Pluronic® P85 in an aqueous solution. For black ink a 5% wt dye of Food Balck2 was added, for cyan ink a 6% wt dye of Avecia ProJet® Cyan Fast2 was added, for magenta ink a 5% wt dye of Tricon acid Red52 was added, and for yellow ink a 5% wt dye of acid Yellow was added.

The viscosity vs. temperature measurements of thermally responsive inks were carried as described above in Example 1, and the results are shown in Table 4.

TABLE 4

Viscosity vs. temperature of the thermally responsive inks

| Temperature (° C.) | Viscosity (CentiPoise) of Thermally Responsive Inks | | | |
|---|---|---|---|---|
| | Black | Cyan | Magenta | Yellow |
| 25 | 6.9 | 5.1 | 5.1 | 6.1 |
| 60 | 3.2 | 2.0 | 2.1 | 2.8 |
| 85 | 3200 | 3100 | 41 | 30 |

The above results show that all the formulated thermally responsive inks have viscosities less than 7 centipoise from room temperature to about 60° C. and have viscosities more than 30 centipoise at 85° C. The black and cyan inks even have viscosities more than 3000 centipoise at 85° C. The results demonstrated that these inks are thermally responsive and can be used in the method of the invention.

Example 3

Print Quality and Color Bleed Evaluation

To evaluate color bleed of inks printed on receiving media, a piezo-electric shear mode printhead was used to print black and yellow color image patterns on receiving media. The nozzle density for each color is 150 nozzles per inch. Each nozzle with a diameter of about 25 μm was fired at 7.5 kHz ejecting about 16 pL inks per drop. The images were printed at a resolution of 600 dpi in the single pass mode. The cartridge travel velocity was set to be 12.531 inches per second such that the time difference between black and yellow ink lay down is about 8 ms. Two types of inkjet photographic papers were used as the receiving media; they are Kodak® Premium Picture Paper (Cat. # 8245276) and Konica® Photo IJ Paper QP. The receiving media were mounted on a heating plate with a temperature control system. Therefore, the surface of receiving media was controlled at the temperature of 85° C. during the printing. The thermally responsive inks used in the test are those of Example 2 above. Two other ink sets were also tested against the performance of the thermally responsive inks of this invention: Kodak® Professional inkjet inks and Brother® MFC-7150c inkjet inks.

The color bleed of images was characterized by measuring the distance of black ink bleeding into yellow ink at the edge between the pattern blocks of yellow and black/yellow under an optical microscope. A scoring system to relate image quality and black to yellow color bleed is established as follows in Table 5:

TABLE 5

A Scoring System in Color Bleed Evaluation

| B/Y Color Bleed Distance (μm) | Image Quality | Evaluation Score |
|---|---|---|
| 0–20 | Excellent | 5 |
| 20–50 | Very Good | 4 |
| 50–100 | Good | 3 |
| 100–300 | Fair | 2 |
| 300–500 | Poor | 1 |
| >500 | Not Acceptable | 0 |

The results of the color bleed evaluation of using the thermally responsive inks to print on heated receiving media are shown in Table 6.

TABLE 6

Scores of Color Bleed Evaluation for Inks Printed on Heated Receiving Media at the Surface Temperature of 85° C.

| | Receiving Medium | |
|---|---|---|
| Ink Set | Kodak ® Premium Picture Paper | Konica ® Photo IJ Paper QP |
| Thermally Responsive inks | 4 | 5 |
| Kodak ® Professional inks | 1 | 2 |
| Brother ® MFC-7150c inks | 1 | 2 |

The above results show that there are significant improvements in color bleed control and image sharpness by using the thermally responsive inks to print on to a heated receiving medium with higher surface temperature. Therefore the method of this invention is demonstrated.

The invention has been described in detail with particular reference to certain preferred embodiments thereof, but it will be understood that variations and modifications can be effected within the spirit and scope of the invention.

What is claimed is:

1. An inkjet printing method comprising providing a liquid inkjet ink which contains a thermally responsive material that will cause the viscosity of the ink to increase rapidly when the ink is heated thereby forming a non-fluidic gel at the elevated temperature, said inkjet ink having a viscosity of less than about 10 centipoise at 22° C. and having a viscosity of more than about 1000 centipoise above its gel transition temperature, and applying the liquid inkjet ink onto an inkjet recording element in an imagewise fashion, wherein the inkjet recording element has been heated to a temperature higher than the temperature of the liquid inkjet ink.

2. The method of claim 1 wherein the thermally responsive material comprises a polyethylene oxide-containing block copolymer.

3. The method of claim 2 wherein the polyethylene oxide-containing block copolymer is a tri-block copolymer of polyethylene oxide-polypropylene oxide-polyethylene oxide.

4. The method of claim 1 in which the thermally responsive material is a methyl cellulose polymer.

5. The method of claim 1 in which the inkjet ink contains about 0.1–40% of the thermally responsive material and about 0.5–10% of a colorant.

6. The method of claim 5 in which the colorant is a dye.

7. The method of claim 5 in which the colorant is a pigment.

8. The method of claim 1 wherein the inkjet recording element has been heated to a temperature of 35° C. or greater.

9. An inkjet printing method with controlled color bleed and drop coalescence comprising;
   a) loading ink ejecting elements of a printer with liquid inkjet ink comprising a thermally responsive material that will cause the viscosity of the ink to increase rapidly when the ink is heated thereby forming a non-fluidic gel at the elevated temperature, said inkjet ink having a viscosity of less than about 10 centipoise at 22° C. and having a viscosity of more than about 1000 centipoise above its gel transition temperature;
   b) loading the printer with an inkjet recording element;
   c) heating the inkjet recording element to a temperature higher than temperature of the inkjet ink in the ink ejecting elements; and
   d) ejecting the liquid inkjet ink from the ink ejecting elements onto the heated inkjet recording element in response to digital data signals.

10. The method of claim 9 wherein the thermally responsive material comprises a polyethylene oxide-containing block copolymer.

11. The method of claim 10 wherein the polyethylene oxide-containing block copolymer is a tri-block copolymer of polyethylene oxide-polypropylene oxide-polyethylene oxide.

12. The method of claim 9 in which the thermally responsive material is a methyl cellulose polymer.

13. The method of claim 9 in which the inkjet ink contains about 0.1–40% of said thermally responsive material and about 0.5–10% of a colorant.

14. The method of claim 13 in which said colorant is a dye.

15. The method of claim 13 in which said colorant is a pigment.

16. The method of claim 9 wherein the inkjet recording element has been heated to a temperature of 35° C. or greater.

* * * * *